United States Patent
Hidano et al.

[11] Patent Number: 5,860,460
[45] Date of Patent: Jan. 19, 1999

[54] REFUELING PIPE STRUCTURE IN FUEL TANK

[75] Inventors: Koichi Hidano; Kazumi Yamazaki; Teruo Wakashiro; Takeshi Hara; Takeaki Nakajima; Masaaki Horiuchi, all of Wako, Japan

[73] Assignee: Honda Giken Kogyo Kabushiki Kaisha, Tokyo, Japan

[21] Appl. No.: 609,377

[22] Filed: Mar. 1, 1996

[30] Foreign Application Priority Data

Mar. 3, 1995 [JP] Japan ................................ 7-044368

[51] Int. Cl.⁶ .................................................. B60K 15/04
[52] U.S. Cl. ......................... 141/286; 141/312; 141/392; 220/86.2
[58] Field of Search ............... 141/69, 312, 286, 141/392; 220/86.1, 86.2

[56] References Cited

U.S. PATENT DOCUMENTS

| | | | |
|---|---|---|---|
| 2,336,430 | 12/1943 | Wery | 141/286 X |
| 3,044,270 | 7/1962 | Biever | 141/286 X |
| 3,180,376 | 4/1965 | Sanborn | 220/86.1 X |
| 3,979,010 | 9/1976 | Fiedler et al. | 141/286 X |
| 4,034,784 | 7/1977 | Ball et al. | 220/86.2 X |
| 4,450,880 | 5/1984 | Scheurenbrand | 220/86.2 X |
| 4,782,974 | 11/1988 | Elkayam | 220/86.1 |
| 5,056,570 | 10/1991 | Harris et al. | 220/86.2 X |
| 5,271,438 | 12/1993 | Griffin et al. | 220/86.2 X |
| 5,309,961 | 5/1994 | Franke et al. | 141/286 |

FOREIGN PATENT DOCUMENTS

| | | | |
|---|---|---|---|
| 2452248 | 5/1975 | Germany | 220/86.2 |
| 57-10921 | 6/1982 | Japan . | |
| 60-156964 | 8/1985 | Japan . | |

*Primary Examiner*—J. Casimer Jacyna
*Attorney, Agent, or Firm*—Nikaido Marmelstein Murray & Oram LLP

[57] ABSTRACT

A refueling pipe structure of a fuel tank includes a tank body, and an a refueling pipe which is connected to the tank body to extend upwardly therefrom. The refueling pipe is provided at its upper end with a refueling port into which a refueling nozzle can be inserted. The structure includes a flow direction limiting device mounted within the refueling pipe in the vicinity of the refueling port for guiding a fuel flow from a tip end of the refueling nozzle toward an inner surface of the refueling pipe, while limiting the fuel flow in a gyrate direction along the inner surface of the refueling pipe. Thus, the generation of evaporated fuel within the refueling pipe during refueling can be inhibited, and fuel can be smoothly introduced into the tank body.

19 Claims, 12 Drawing Sheets

REFUELING PIPE STRUCTURE IN FUEL TANK

BACKGROUND OF THE INVENTION

1. Field of the Invention

The present invention relates to a refueling pipe structure for smoothly guiding fuel, supplied from a refueling nozzle, into a fuel tank. The refueling pipe structure includes a tank body, and a refueling pipe which is connected to the tank body to extend upwardly therefrom. The refueling pipe structure is provided at an upper end of the refueling pipe with a refueling port into which a refueling nozzle can be inserted.

2. Description of the Related Art

There are conventionally known refueling pipe structures. One structure has a plurality of flow control members mounted on an inner surface of the refueling pipe to extend substantially along an axis of the refueling pipe (Japanese Patent Application Laid-open No. 156964/85). Another structure has a refueling guide, which is formed spirally, mounted on the inner surface of the refueling pipe (see Japanese Patent Application Laid-open No. 10921/82). The flow control members and the refueling guide are mounted in order to prevent fuel, supplied from the refueling nozzle, from colliding against an inner surface of the refueling pipe and from scattering. The scattered fuel strikes an automatic oil-supply stoppage detection portion of the refueling nozzle and as a result, the refueling by the refueling nozzle is automatically stopped.

In the known refueling pipe structures, however, fuel supplied from the refueling nozzle cannot avoid colliding against the flow control members and the refueling guide. The amount of fuel evaporated within the refueling pipe is relatively increased due to such collision. If evaporated fuel is generated, leakage of the evaporated fuel from the fuel tank increases during refueling. Thus, in a system designed to adsorb evaporated fuel generated during refueling by a canister, it is necessary to increase the capacity of the canister.

SUMMARY OF THE INVENTION

Accordingly, it is an object of the present invention to provide a refueling pipe structure in a fuel tank, wherein the generation of evaporated fuel within the refueling pipe can be inhibited, and fuel can be smoothly introduced to the tank body.

To achieve the above object, according to a first aspect and feature of the present invention, there is provided a refueling pipe structure in a fuel tank, comprising a tank body, and a refueling pipe which is connected to the tank body to extend upwardly therefrom. The refueling pipe is provided at an upper end with a refueling port into which a refueling nozzle can be inserted. The structure includes a flow direction limiting device mounted within the refueling pipe in the vicinity of the refueling port. The flow direction limiting device guides a fuel flow from a tip end of the refueling nozzle toward an inner surface of the refueling pipe, while limiting the fuel flow in a gyrate direction along the inner surface of the refueling pipe.

With the first feature of the present invention, the fuel supplied from the refueling nozzle is smoothly guided to the inner surface of the refueling pipe by the flow direction limiting device and introduced into the tank body while being gyrated along the inner surface of the refueling pipe. Thus, the generation of evaporated fuel is inhibited by inhibiting fuel scattering.

According to a second aspect and feature of the present invention, there is provided a refueling pipe structure in a fuel tank, comprising a tank body, and a refueling pipe which is connected to the tank body to extend upwardly therefrom. A refueling port is provided at an upper end of the refueling pipe and into which a refueling nozzle can be inserted. The structure includes an insertion attitude limiting device mounted within the refueling pipe in the vicinity of the refueling port. The insertion attitude limiting device inclines an insertion attitude of the refueling nozzle inserted into the refueling port with respect to an axis of the refueling pipe to limit a fuel flow from the refueling nozzle in a gyrate direction along the inner surface of the refueling pipe.

With the second feature of the present invention, the fuel supplied from the refueling nozzle is introduced into the tank body while being gyrated along the inner surface of the refueling pipe by the limitation of the attitude of the refueling nozzle by the insertion attitude limiting device. Thus, generation of evaporated fuel is inhibited by inhibiting fuel scattering.

The above and other objects, features and advantages of the invention will become apparent from the following detailed description of preferred embodiments taken in conjunction with the accompanying drawings.

DETAILED DESCRIPTION OF THE PREFERRED EMBODIMENTS

The present intention will now be described by way of preferred embodiments with reference to the accompanying drawings.

FIGS. 1 to 6 show a first embodiment of the present invention.

Figure 1:
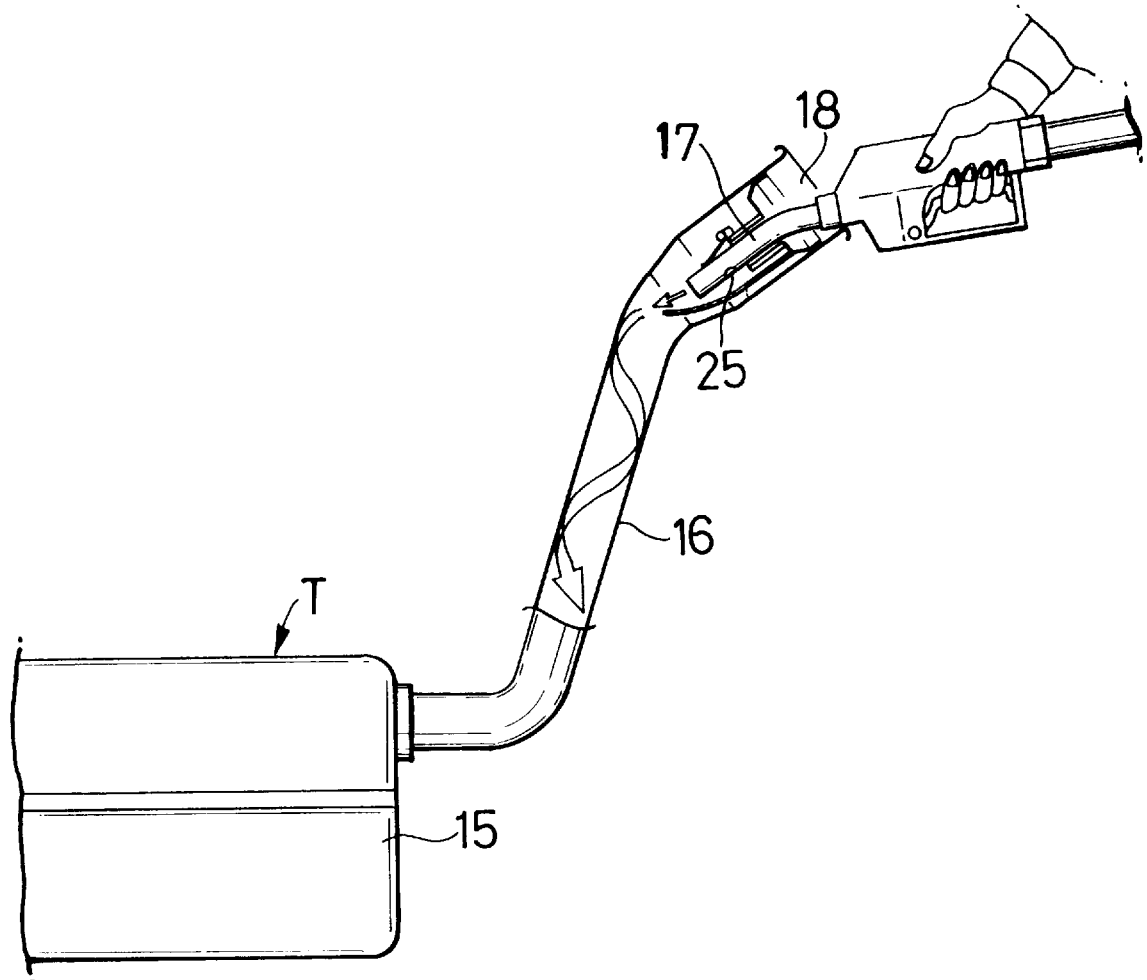
FIG. 1 is a partially cutaway side view of a fuel tank according to a first embodiment.
Figure 2:
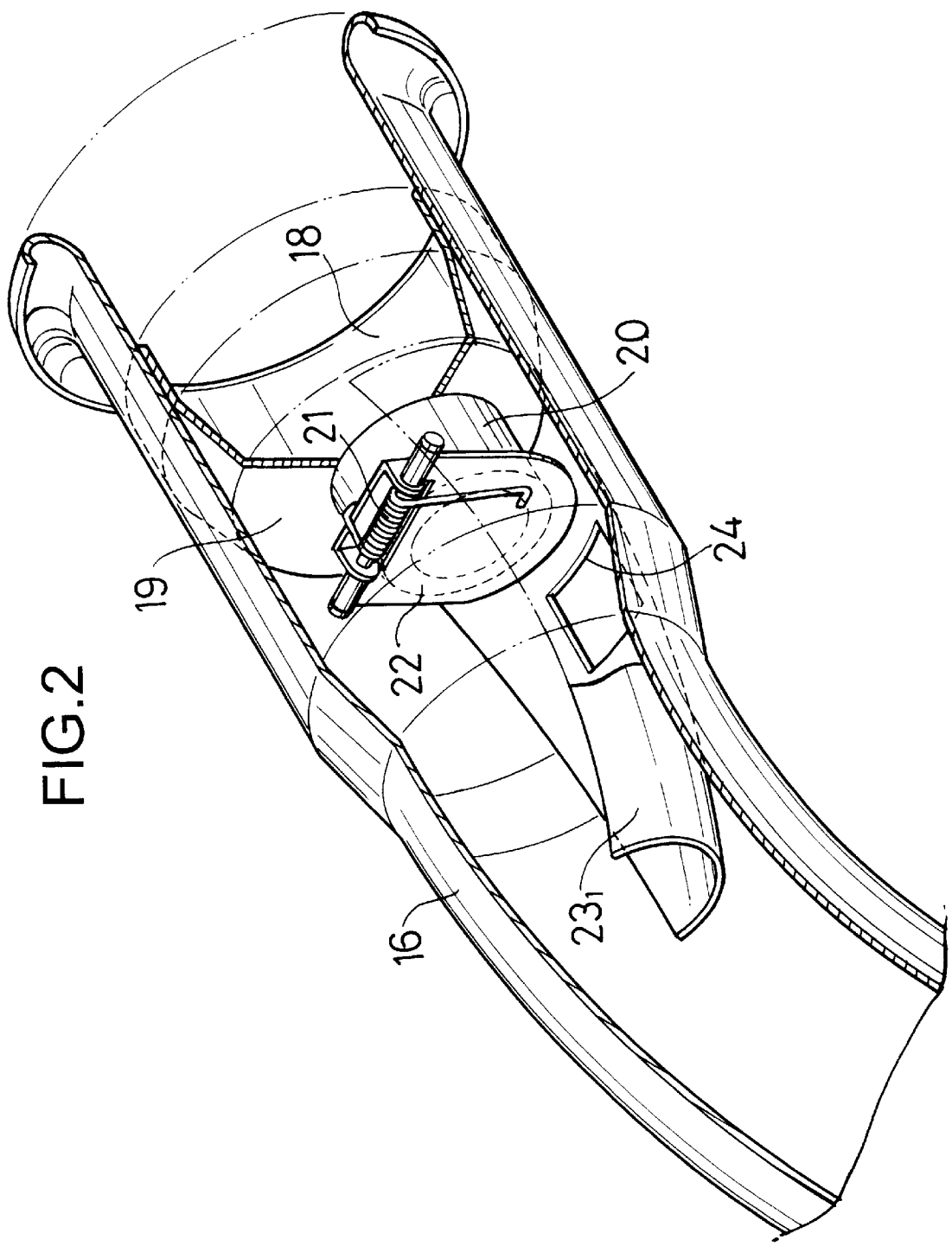
FIG. 2 is a cutaway enlarged perspective view of a section in the vicinity of a refueling port in a refueling pipe.
Figure 3:
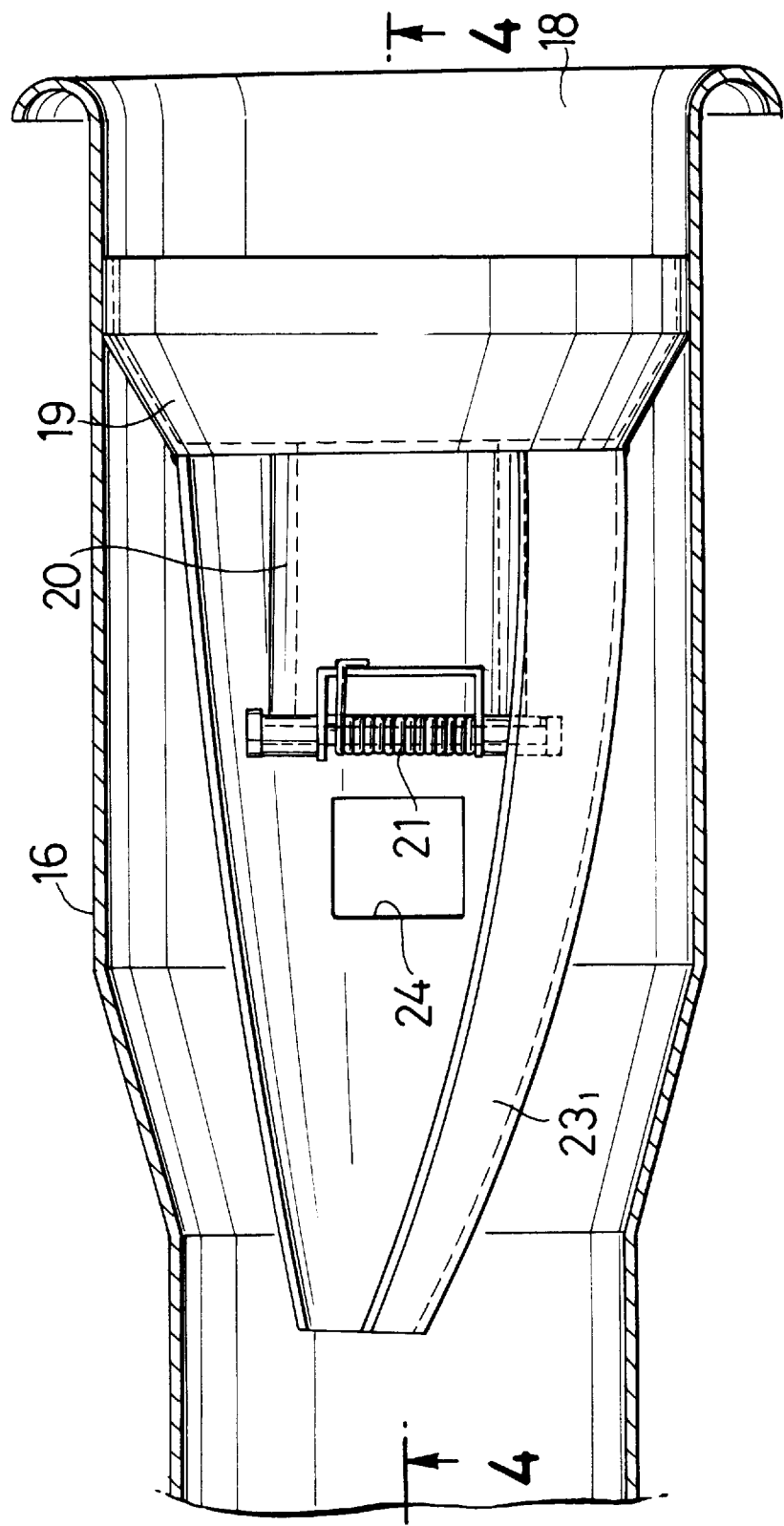
FIG. 3 is a cross-sectional plan view of the section in the vicinity of the refueling port in the refueling pipe.
Figure 4:
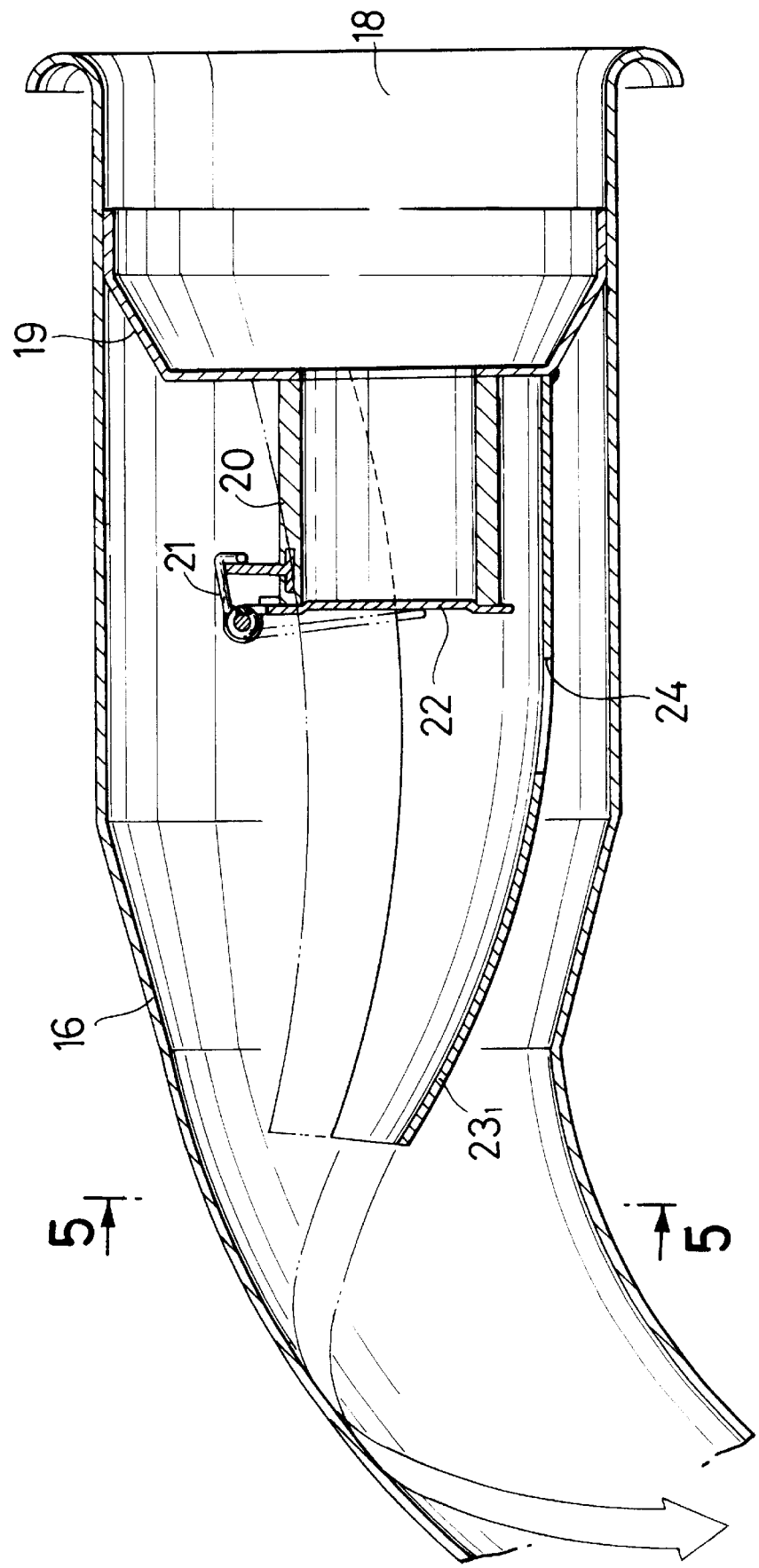
FIG. 4 is a sectional view taken along a line 4—4 in FIG. 3.
Figure 5:
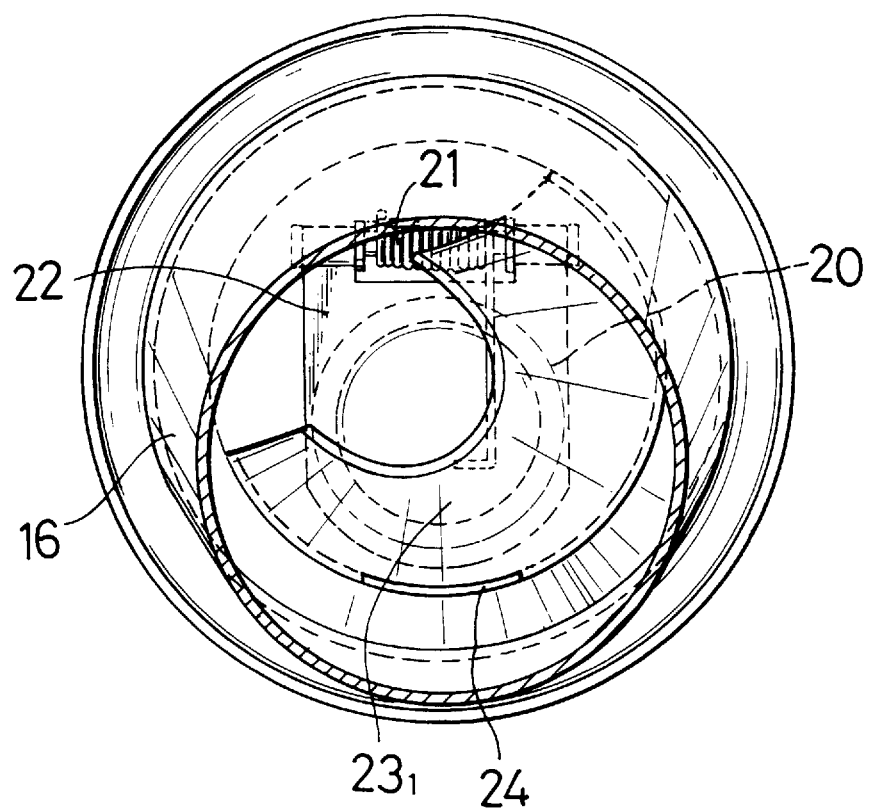
FIG. 5 is a sectional view taken along a line 5—5 in FIG. 4.

Referring to FIG. 1, a fuel tank T mounted in a vehicle includes a tank body 15 for storing fuel, and a refueling pipe 16 connected to the tank body 15 and extending upwarding therefrom. A refueling port 18, into which a refueling nozzle 17 can be inserted, is provided in an upper end of the refueling pipe 16.

Referring to FIGS. 2 to 5, a conventionally known different-fuel supply preventing guide 19 is provided in the refueling port 18 in the refueling pipe 16 for preventing the insertion of a refueling nozzle for a fuel different from the fuel which is to be stored in the fuel tank T. A cylindrical attitude stabilizing guide member 20 is secured to an inner end of the different-fuel supply preventing guide 19 for permitting the refueling nozzle 17 to be inserted in a manner that its axis is parallel to, for example, an axis of the refueling port 18. Moreover, a shutter valve 22 is pivotally mounted for opening and closing at a tip end of the attitude stabilizing guide member 20. The shutter valve 22 is biased by a spring 21 in a direction to close the tip end of the guide member 20. When the refueling nozzle 17 is inserted into the attitude stabilizing guide member 20, the shutter valve 22 is forcibly opened by the tip end of the refueling nozzle 17. However, when the refueling nozzle 17 is not inserted, the shutter valve 22 is maintained at its closed state.

According to the present invention, a flow direction limiting means $23_1$ is mounted in the refueling pipe 16 in the vicinity of the refueling port 18. The flow direction limiting means $23_1$ is formed into a U-shape in cross section with its upper portion opened, and is secured at its base end to the different-fuel supply preventing guide 19 so as to cover the attitude stabilizing guide member 20. Moreover, the flow direction limiting means $23_1$ is formed so that it is convergent toward its tip end, and so that a fuel flow from the tip end of the refueling nozzle 17 is guided in a gyrate direction toward an inner surface of the refueling pipe 16.

An opening 24 is provided in a middle lower portion of the flow direction limiting means $23_1$. This opening 24 corresponds to a detecting hole 25 (see FIG. 1) provided in a lower portion of the refueling nozzle 17 in a refueling gun having an auto-stop mechanism, and is of a structure such that the detecting hole 25 is not occluded by the flow direction limiting means $23_1$.

The operation of the first embodiment will be described below. During refueling into the refueling pipe 16 by the refueling nozzle 17, the flow direction of the fuel discharged from the tip end of the refueling nozzle 17 is limited by the flow direction limiting means $23_1$, so that the fuel is guided toward the inner surface of the refueling pipe 16. Because the flow direction limiting means $23_1$ guides the fuel flow from the tip end of the refueling nozzle 17 to the inner surface of the refueling pipe 16, the fuel flow from the refueling nozzle 17 is introduced into the tank body 15 while being gyrated along the inner surface of the refueling pipe 16. Thus, scattering of the fuel within the refueling pipe 16 is inhibited, whereby the generation of evaporated fuel within the refueling pipe 16 is also inhibited.

Figure 6:
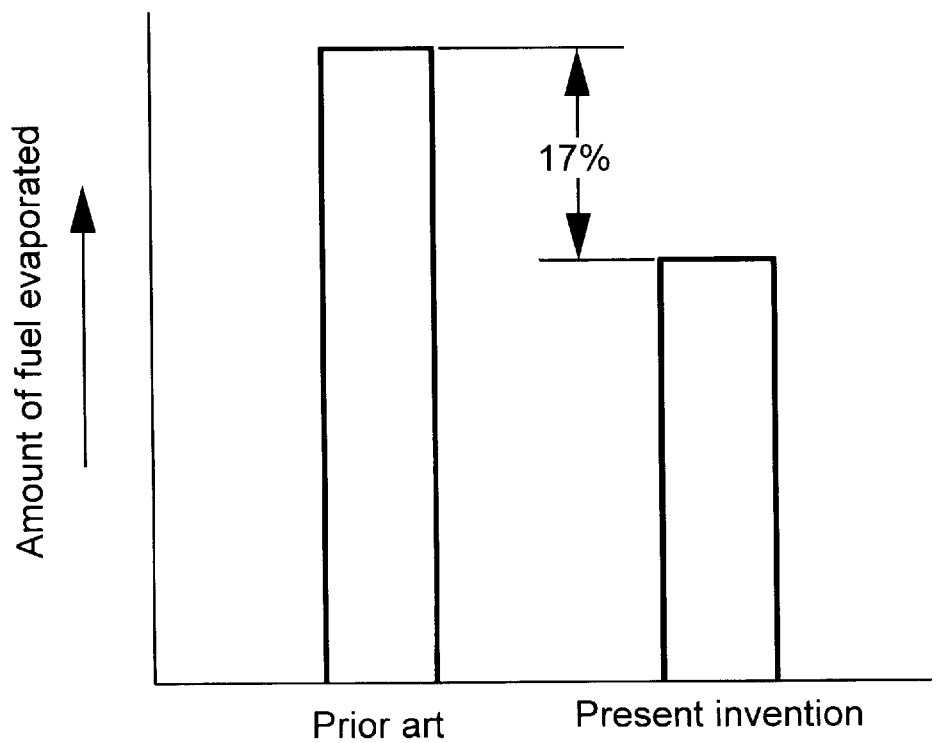
FIG. 6 is a graph illustrating the amount of evaporated fuel generated by comparison with that in a known structure.

If the amount of evaporated fuel generated within the refueling pipe 16 in the structure according to the present invention including the flow direction limiting means $23_1$ is compared with a known refueling pipe which does not include the flow direction limiting means $23_1$, the result is as shown in FIG. 6. Thus, the amount of evaporated fuel generated within the refueling pipe 16 in the structure according to the present invention is 17% lower than that of the known refueling pipe.

Figure 7:
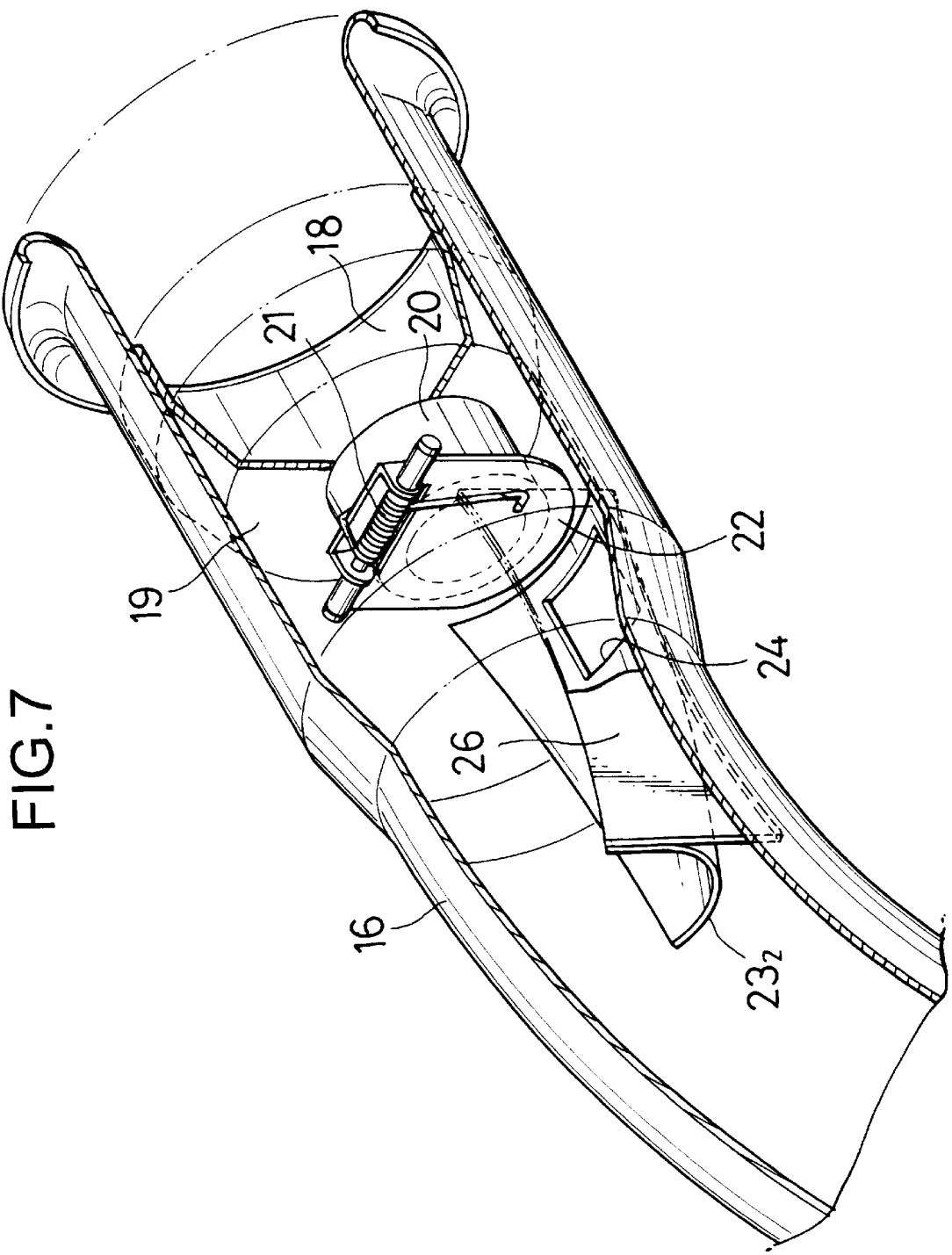
FIG. 7 is a cutaway enlarged perspective view of a section in the vicinity of a refueling port in a refueling pipe in a second embodiment.
Figure 8:
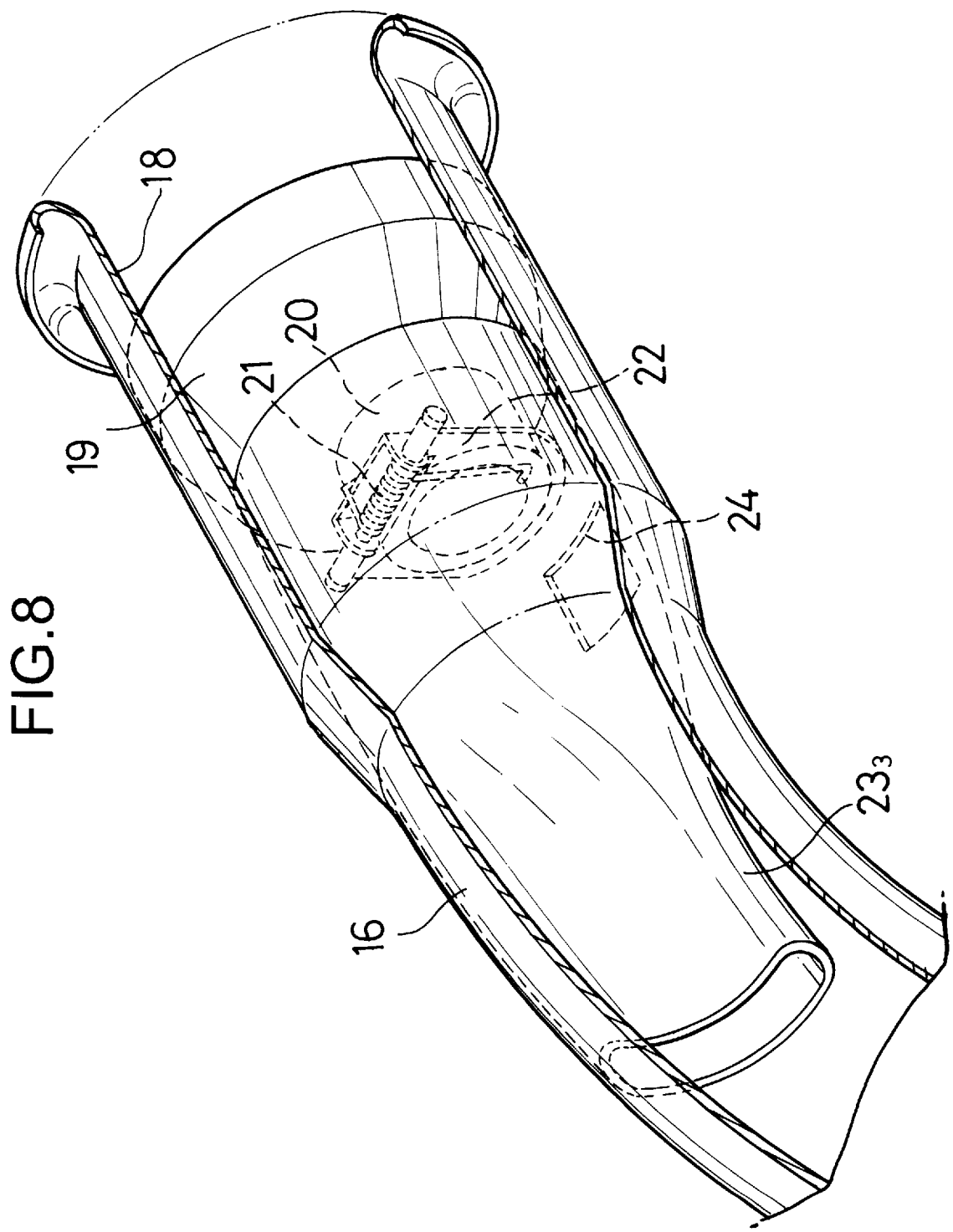
FIG. 8 is a cutaway enlarged perspective view of a section in the vicinity of a refueling port in a refueling pipe in a third embodiment.
Figure 9:
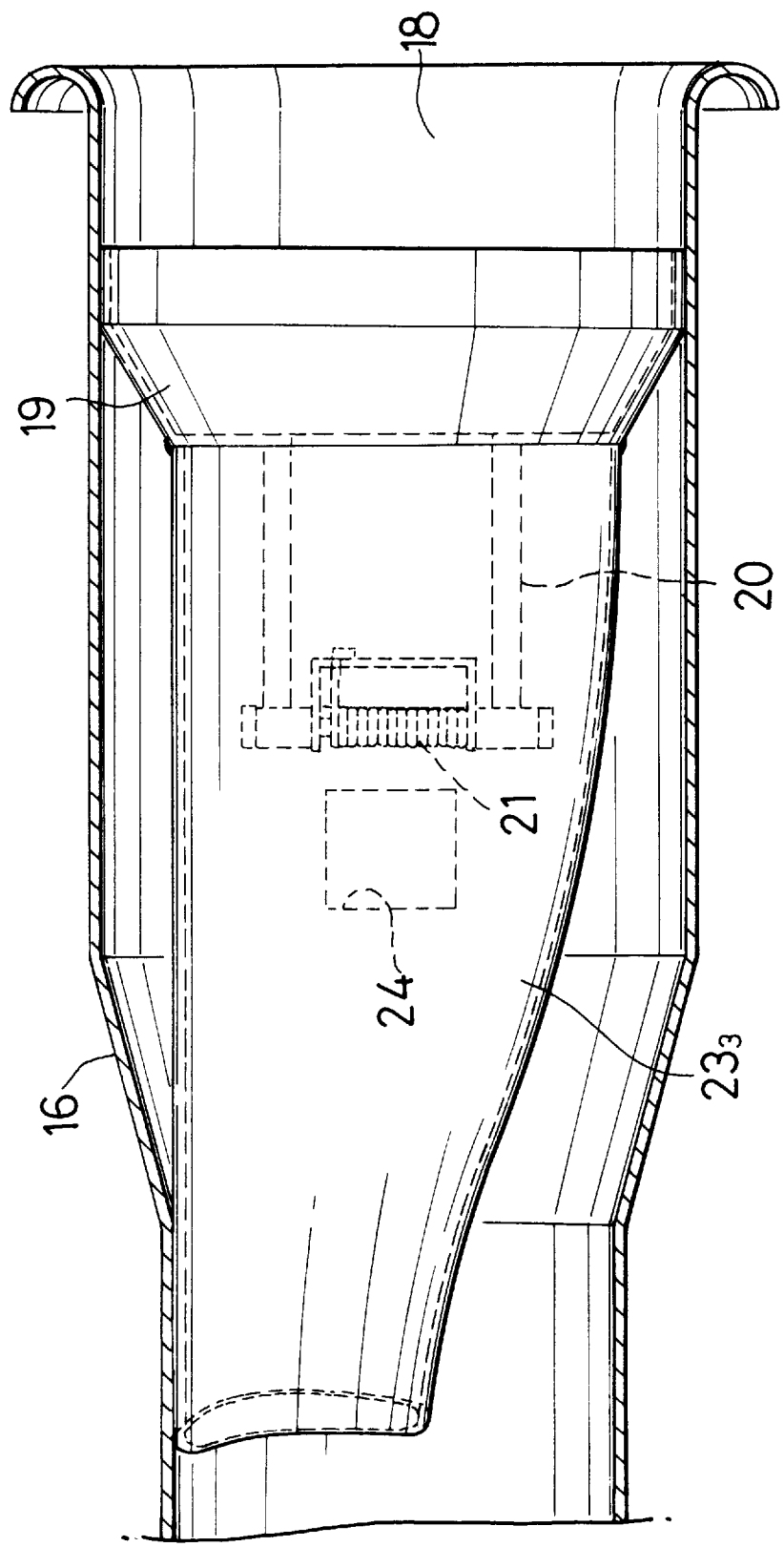
FIG. 9 is a cross-sectional plan view of the section in the vicinity of the refueling port in the refueling pipe.
Figure 10:
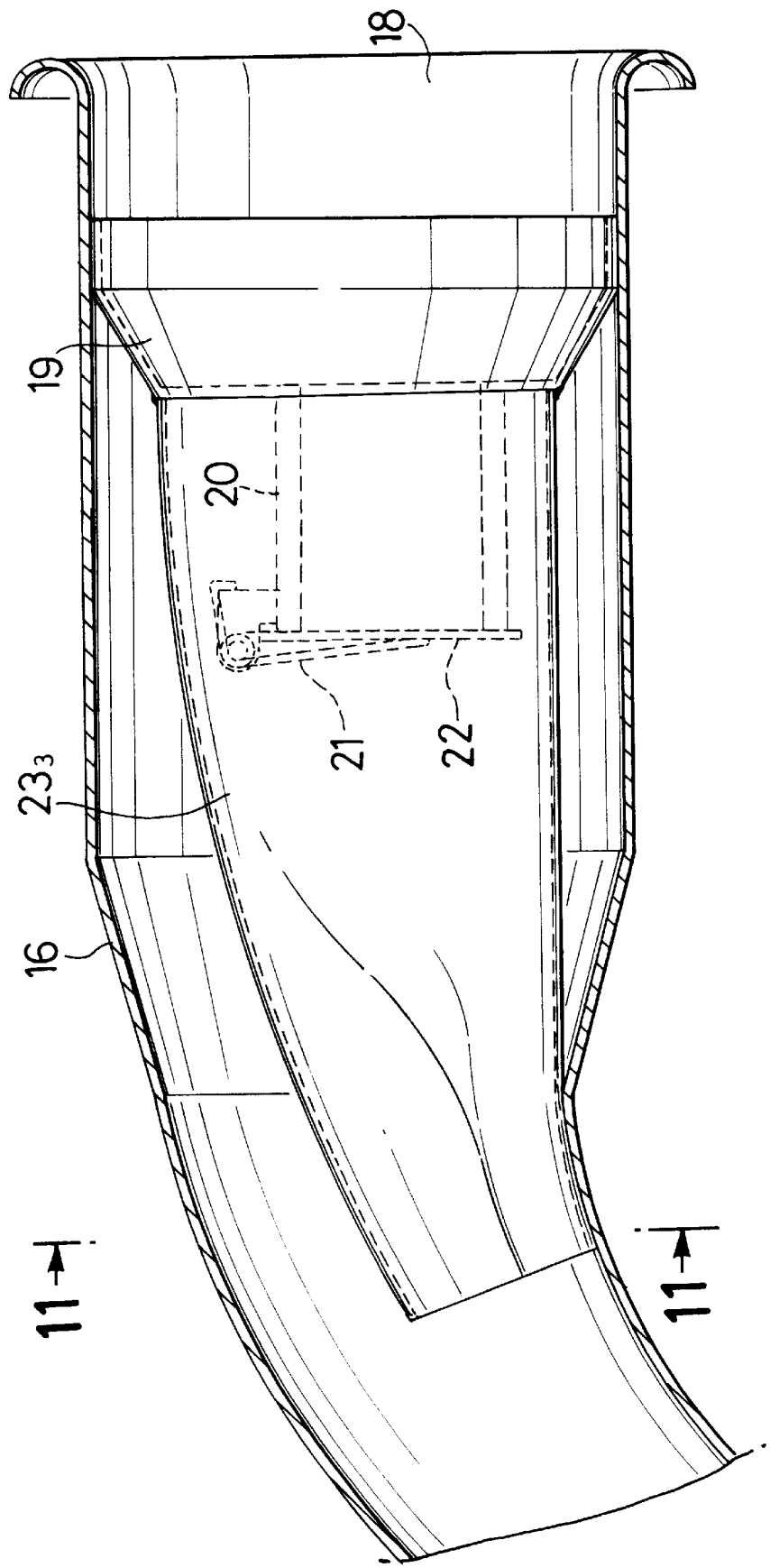
FIG. 10 a vertical sectional side view of the section in the vicinity of the refueling port in the refueling pipe.
Figure 11:
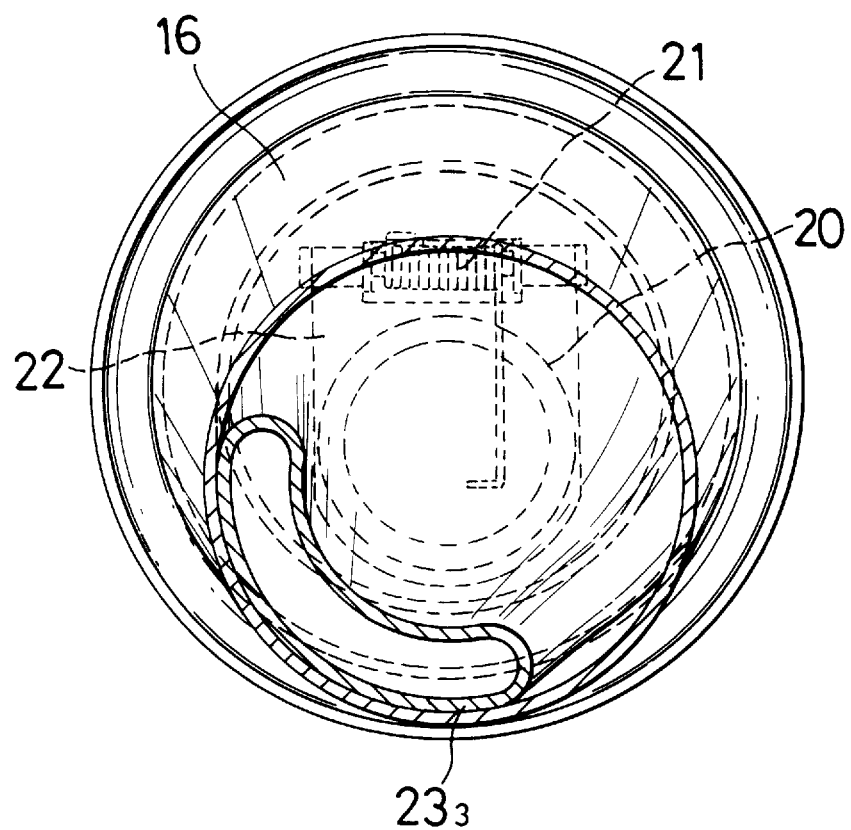
FIG. 11 is a sectional view taken along a line 11—11 in FIG. 10.

FIG. 7 illustrates a second embodiment of the present invention. In the second embodiment, a flow direction limiting means $23_2$ is mounted within the refueling pipe 16 in the vicinity of the refueling port 18. The flow direction limiting means $23_2$ has basically the same shape as the flow direction limiting means $23_1$ in the first embodiment. However, in the first embodiment, the flow direction limiting means $23_1$ is secured to the different-fuel supply preventing guide 19. In this embodiment, the flow direction limiting means $23_2$ is secured to the inner surface of the refueling pipe 16 by a support plate 26.

FIGS. 8 to 11 illustrate a third embodiment of the present invention. In the third embodiment, a flow direction limiting means $23_3$ is mounted within the refueling pipe 16 in the vicinity of the refueling port 18. The flow direction limiting means $23_3$ is formed into a cylindrical shape such that it is convergent toward a tip end and connected to the different-fuel supply preventing guide 19 while surrounding the attitude stabilizing guide member 20, so that the fuel flow from the tip end of the refueling nozzle 17 is guided toward the inner surface of the refueling pipe 16.

Even in the third embodiment, the fuel flow from the tip end of the refueling nozzle 17 is limited so that it is gyrated along the inner surface of the refueling pipe 16 by the flow direction limiting means $23_3$, as in the previously described embodiments. As a result, scattering of the fuel within the refueling pipe 16 can be inhibited, whereby the generation of evaporated fuel within the refueling pipe 16 can be also inhibited.

In the first, second and third embodiments, the attitude stabilizing guide member 20 is disposed to protrude from the inner end of the different-fuel supply preventing guide 19. Alternatively, the attitude stabilizing guide member 20 may be connected to the inner end of the different-fuel supply preventing guide 19, in such a manner that it is located inside the different-fuel supply preventing guide 19.

Figure 12:
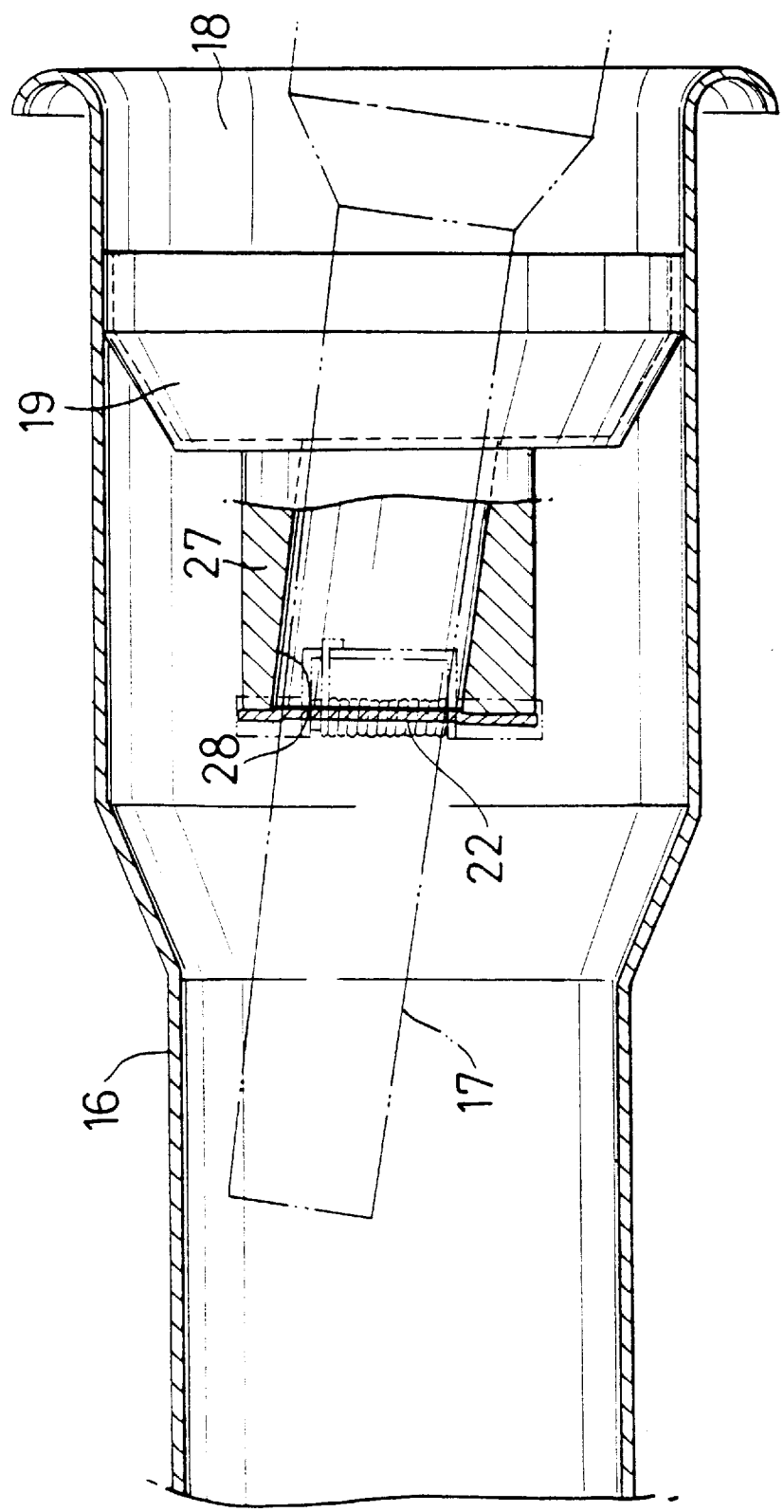
FIG. 12 is a cross-sectional plan view of a section in the vicinity of a refueling port in a refueling pipe in a fourth embodiment.

FIG. 12 illustrates a fourth embodiment of the present invention, wherein the portions or components corresponding to those in each of the previously described embodiments are designated by like reference numerals.

An insertion attitude limiting means 27 is mounted within the refueling pipe 16 in the vicinity of the refueling port 18 for limiting the attitude of the refueling nozzle 17 inserted into the refueling port 18.

The insertion attitude limiting means 27 is formed into a cylindrical shape having an insertion hole 28 for permitting the insertion of the refueling nozzle 17, and is connected to the different-fuel supply preventing guide 19. A shutter valve 22 is disposed at a tip end of the insertion attitude limiting means 27 and adapted to be opened in response to the insertion of the refueling nozzle 17 into the insertion hole 28. The insertion hole 28 has an axis inclined with respect to an axis of the refueling pipe 16, and the fuel flow from the refueling nozzle 17 inserted into the insertion hole 28 is limited in such a direction that it is gyrated along the inner surface of the refueling pipe 16.

In the fourth embodiment, the fuel from the refueling nozzle 17 is introduced while being gyrated along the inner surface of the refueling pipe 16 by limiting of the insertion attitude of the refueling nozzle 17 by the insertion attitude limiting means 27. Thus, scattering of the fuel is inhibited, whereby the generation of evaporated fuel is also inhibited.

Although the embodiments of the present invention have been described in detail, it is to be understood that the present invention is not limited to the above-described embodiments, and various modifications may be made without departing from the spirit and scope of the invention defined in the claims.

What is claimed is:

1. A refueling pipe structure of a fuel tank comprising:

a tank body;

a refueling pipe which is connected to said tank body, said refueling pipe extending upwardly from said tank body, an upper end of said refueling pipe provided with a refueling port into which a refueling nozzle is inserted; and a flow direction limiting means, mounted within said refueling pipe in a vicinity of said refueling port and partially surrounding a tip end of said refueling nozzle, when inserted into the refueling port, and extending beyond the tip end toward the tank body, for guiding a fuel flow from the tip end of said refueling nozzle toward an inner surface of said refueling pipe, and for limiting the fuel flow in a gyrate direction along the inner surface of said refueling pipe.

2. A refueling pipe structure according to claim 1, wherein said flow direction limiting means is formed into a U-shape in cross section with an open upper portion.

3. A refueling pipe structure according to claim 2, wherein said flow direction limiting means is formed to converge toward a tip end.

4. A refueling pipe structure according to claim 1, wherein said flow direction limiting means is formed to converge toward a tip end.

5. A refueling pipe structure according to claim 1, wherein said flow direction limiting means is provided with an opening.

6. A refueling pipe structure according to claim 5, wherein said opening is located in a middle lower portion of said flow direction limiting means.

7. A refueling pipe structure according to claim 5, wherein said opening is provided to correspond to a detecting hole of the refueling nozzle having an auto-stop mechanism.

8. A refueling pipe structure according to claim 1, wherein said refueling port is provided with a different-fuel supply preventing guide for preventing insertion of a refueling nozzle for a fuel different from fuel which is to be stored in said tank body.

9. A refueling pipe structure according to claim 8, wherein said flow direction limiting means is secured to said different-fuel supply preventing guide.

10. A refueling pipe structure according to claim 8, further comprising a cylindrical attitude stabilizing guide member for permitting the refueling nozzle to be inserted in a manner that an axis thereof is parallel to an axis of the refueling port.

11. A refueling pipe structure according to claim 10, wherein said cylindrical attitude stabilizing guide member is secured to said different-fuel supply preventing guide.

12. A refueling pipe structure according to claim 10, wherein said attitude stabilizing guide member protrudes from an inner-side one of opposite ends of the different-fuel supply preventing guide.

13. A refueling pipe structure according to claim 12, wherein said flow direction limiting means covers said attitude stabilizing guide member.

14. A refueling pipe structure according to claim 10, wherein said attitude stabilizing guide member is connected to an inner end of the different-fuel supply preventing guide and located inside the different-fuel supply preventing guide.

15. A refueling pipe structure according to claim 10, wherein said flow direction limiting means covers said attitude stabilizing guide member.

16. A refueling pipe structure according to claim 15, wherein said flow direction limiting means is formed into a cylindrical shape.

17. A refueling pipe structure according to claim 1, wherein said flow direction limiting means is secured to an inner surface of the refueling pipe.

18. A refueling pipe structure according to claim 1, wherein said flow direction limiting means is secured to an inner surface of the refueling pipe by a support member.

19. A refueling pipe structure according to claim 1, wherein said flow direction limiting means is formed into a cylindrical shape.

* * * * *